Patented May 10, 1949

2,469,427

UNITED STATES PATENT OFFICE 2,469,427

PROCESS FOR TREATING WOOD

Roy H. Baechler, Madison, Wis.; dedicated to the free use of the People in the territory of the United States No Drawing. Application July 30, 1946,
Serial No. 687,050

4 Claims. (Cl. 167—38.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention relates to a solution for impregnating wood or other cellulosic material and has for its object a treatment of the wood in one operation, whereby there is subsequently deposited in the wood a toxic material of low solubility that will more or less permanently protect the wood from decay and insects without increasing its combustibility.

It has been known for some time that insoluble materials may be deposited in wood by treating it with a solution containing a soluble dichromate, a soluble arsenate, and salts of certain metals. Such solutions are slightly acidic at the time of injection into the wood, but thereafter the acidity is gradually decreased, due to the reduction of dichromate by the wood. As the acidity decreases, insoluble chromates and arsenates are deposited in the wood.

It is old to use copper salts in such mixtures, thereby producing a wood that is resistant to decay and insects but which is known to have the tendency to continue to glow once it has been ignited so that even after the flame has been extinguished, the charred wood may continue to glow until it is consumed. This phenomenon has been explained by the theory that when copper and chromium are present together with both in fairly large amounts, they catalyze the oxidation of the wood.

In addition to copper salts, salts of metals that are much less noble and also less toxic, such as zinc, cadmium, manganese, and calcium, have been used.

I have found that, by substituting nickel salts for copper salts in such solutions, I can deposit in wood compounds that are substantially as toxic as the analogous copper salts and more toxic than the analogous salts of the base metals such as zinc, cadmium, manganese, and calcium.

The advantage of using nickel salts in place of copper salts is that the proportion of dichromate in the treating solution may be held so low that the treated wood is no more combustible than is untreated wood. Whereas, with copper salts a high ratio of dichromate to copper must be maintained to prevent the deposition of copper on iron treating equipment, with nickel salts only a low concentration of dichromate is needed to inhibit the feeble tendency of nickel to plate out on iron. This is due to the small difference in the electrolytic potentials of iron and nickel.

Nickel possesses a unique combination of properties. It is not very noble in some of its electrochemical properties, but I have found that it has a very high toxicity toward wood-destroying fungi in which respect it resembles more noble metals such as silver, mercury and copper. Toward certain fungi growing on agar, nickel salts are distinctly more toxic than are the analogous copper salts. Wood treated with a mixture of a nickel salt, an arsenate, and a dichromate has been found by field tests to be very resistant to decay and insects.

The proportions of the nickel, dichromate, and arsenate in the treating solution may be varied considerably. The total content of the alkali metal should be approximately equivalent, chemically, to the anion of the nickel salt. The weight ratio of chromium to nickel may be as low as 2:100 without permitting serious corrosion of iron containers or treating equipment; on the other hand, it may be as high as 60:100 without rendering the treated wood subject to any noticeable tendency to glow after being subjected to a charring flame.

When the chromium content is very low a measurable fire retardance may be imparted to the wood, but in such treatments the deposition of insoluble material is incomplete so that the treated wood is suitable only for situations in which leaching conditions are mild. I prefer the solutions with the higher proportions of chromium within the limits stated, since they impart to the wood the properties which are generally of greatest practical importance, namely, a relatively permanent resistance to decay and insects, even under conditions favoring leaching.

While any soluble nickel salts may be used, I prefer the sulfate because of its cheapness. For the same reason I prefer the sodium dichromate and sodium arsenate.

The following example may be given for the ratio of chemicals used to prepare the treating solution:

| | Parts by weight |
|---|---|
| Nickel sulfate ($NiSO_4.6H_2O$) | 26 |
| Monosodium arsenate ($NaH_2AsO_4$) | 21 |
| Sodium dichromate ($Na_2Cr_2O_7.2H_2O$) | 10 |

Depending upon market conditions, it may be expedient to replace the above chemicals with other chemicals to obtain the same concentrations of the different ions in the solution. For example, monosodium arsenate may be replaced with a mixture of equimolecular parts of arsenic acid and disodium arsenate. Or, arsenic acid may be dissolved in a solution of sodium hydroxide or sodium carbonate in the molar ratio of one mol of arsenic acid to one mol of sodium hydroxide or ½ mol of sodium carbonate. Chromic acid may be used in place of sodium dichromate with, at the same time, a corresponding replacement of monosodium arsenate with disodium arsenate so that the sodium content is approximately equivalent, chemically, to the sulfate.

To avoid any corrosive action by the nickel salt the dichromate should be dissolved before the nickel salt is added.

The solution normally contains a small amount of suspended insoluble material formed by hydrolysis. If hard water is used, the amount of suspended material may be sufficient to result in an objectionable deposit on the surface of the treated wood. In such case a small amount of acid, such as acetic acid or additional arsenic acid, may be added to dissolve the suspended material.

The strength of the solution is varied according to such factors as absorption of chemical desired, species being treated, and method of treatment being used. Solutions varying from 1 to 5 percent total solids are most commonly used.

The solution should be applied cold. Of the various well-known methods of treating wood, pressure impregnation of the cold solution is the most effective for the application of this preservative.

Having thus described my invention, I claim:

1. A wood-preservative solution containing a soluble nickel salt, alkali metal ion, arsenic acid ion and a dichromate in such proportions that the alkali metal is approximately the chemical equivalent of the anion of the nickel salt, and the ratio of chromium to nickel is at least about 2:100 and not greater than about 60:100.

2. The solution defined in claim 1 in which the soluble nickel salt is nickel sulfate, the arsenate is a sodium arsenate, and the dichromate is sodium dichromate.

3. A wood-preservative solution containing a soluble nickel salt, alkali metal ion, arsenic acid ion, and a chromic compound of the group consisting of chromic acid and dichromates, the alkali metal ion being present in an amount that is approximately the chemical equivalent of the anion of the nickel salt, and the ratio of chromium to nickel is at least 2:100 and not greater than about 60:100.

4. The solution defined in claim 3 in which the nickel salt is nickel sulfate, the alkali metal ion is sodium ion, and the chromic compound is sodium dichromate.

ROY H. BAECHLER.

REFERENCES CITED

The following references are of record in the file of this patent:

UNITED STATES PATENTS

| Number | Name | Date |
|---|---|---|
| 1,990,292 | Leatherman | Feb. 5, 1935 |
| 2,106,978 | Kamesam | Feb. 1, 1938 |
| 2,139,747 | Hager | Dec. 13, 1938 |
| 2,194,827 | Gordon | Mar. 26, 1940 |
| 2,202,579 | Hager | May 28, 1940 |
| 2,325,359 | Arnold | July 27, 1943 |
| 2,366,612 | Hager | Jan. 2, 1945 |
| 2,408,978 | Hager | Oct. 8, 1946 |